United States Patent

Takahashi et al.

[15] 3,638,187
[45] Jan. 25, 1972

[54] AUTOMATIC CURVE TRACING SYSTEM

[72] Inventors: Tadashi Takahashi; Masatoshi Miyazaki, both of Sendai; Yasuhiko Ogawa, Natori; Tadashi Sato; Kazuhiko Kakuta, both of Tokyo, all of Japan

[73] Assignee: Iwatsu Electric Company, Ltd., Tokyo, Japan

[22] Filed: May 28, 1970

[21] Appl. No.: 41,291

[30] Foreign Application Priority Data

May 31, 1969 Japan....................................44/42078

[52] U.S. Cl............................................340/146.3, 250/202
[51] Int. Cl.........................................G06k 11/02, G06k 9/16
[58] Field of Search.................250/202, 203; 340/146.3 AE; 235/61.6 A

[56] References Cited

UNITED STATES PATENTS

| | | | |
|---|---|---|---|
| 3,427,457 | 2/1969 | Domenico | 250/203 |
| 3,383,516 | 5/1968 | Leimer | 340/146.3 |
| 3,245,036 | 4/1966 | Grottrup | 250/202 |
| 3,155,452 | 11/1964 | Plankeel | 250/202 |
| 2,988,682 | 6/1961 | Wilhelm | 250/202 |

*Primary Examiner*—Gareth D. Shaw
*Attorney*—Chittick, Pfund, Birch, Samuels & Gauthier

[57] ABSTRACT

In an automatic curve tracing system wherein an area including a curve to be traced is subjected to a round scanning operation of a detector to produce a positional information and the detector is moved in a predetermined direction over a predetermined direction in response to the positional information, there is provided apparatus for processing an acute angle included in the curve including means to store a previous tracing direction and means to determine a particular direction having a minimum difference with respect to the previous tracing direction and within prescribed limits.

6 Claims, 11 Drawing Figures

TADASHI TAKAHASHI
MASATOSHI MIYAZAKI
YASUHIKO OGAWA     INVENTORS
TADASHI SATO
KAZUHIKO KAKUTA

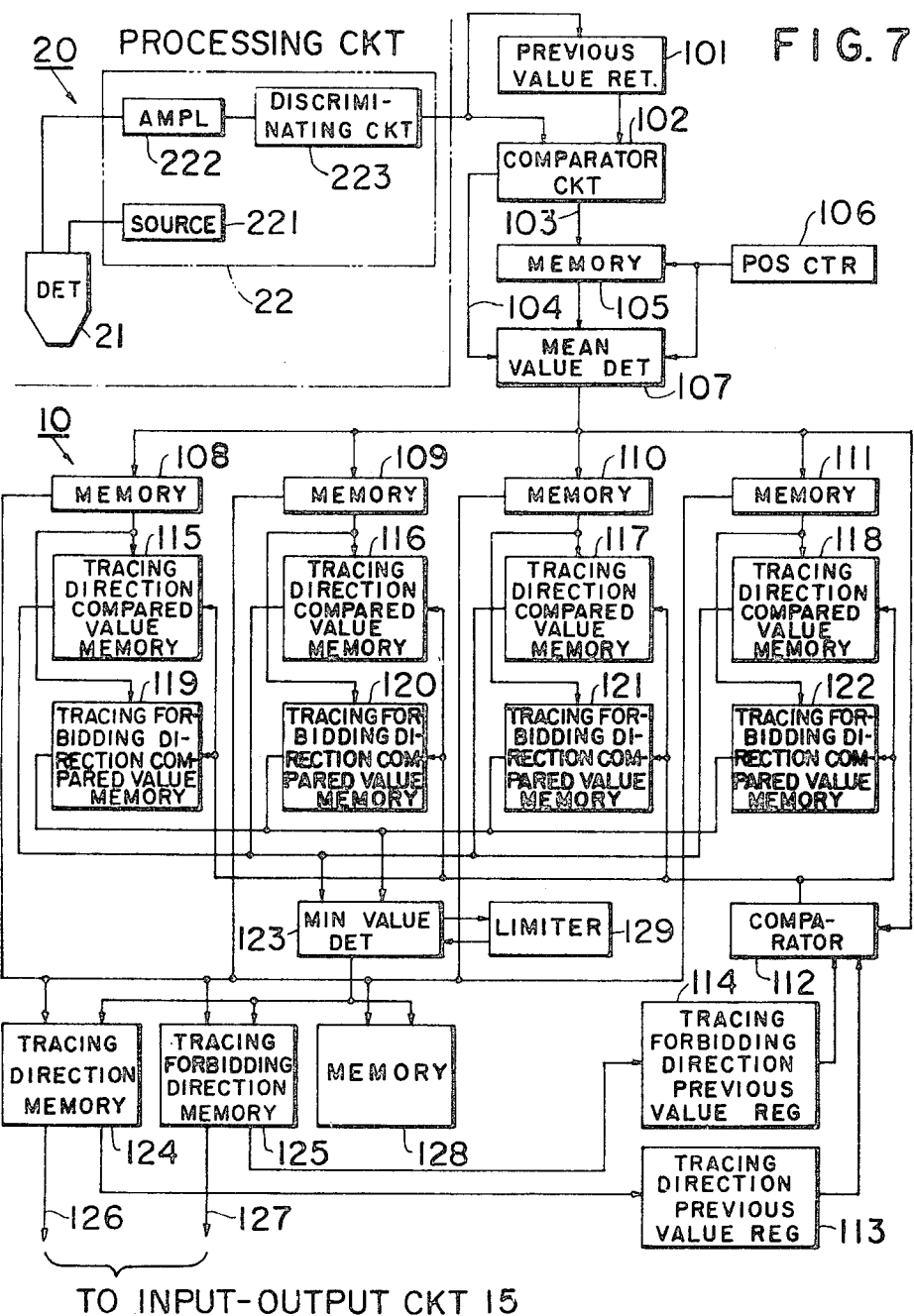

AUTOMATIC CURVE TRACING SYSTEM

CROSS-REFERENCE TO RELATED APPLICATIONS

This application is related to applications filed of even date herewith, Ser. Nos.: 41,297, 41,172, 41,296 and 41,471, all assigned to the assignee of the present invention.

BACKGROUND OF THE INVENTION

This invention relates to an automatic curve tracing system including an acute angle processing means capable of discriminating a curve bent at an acute angle from a branch or crossing.

In many fields of engineering it is highly desirable to trace various curves depicted on a sheet of drawing and to convert them into digital electrical signals. For example, such requirements arise when it is desired to analyze such waveforms as cardiograms, brain waves, and earthquake waves and to recognize patterns. At present when supplying various data curves to an electronic computer and the like, the data curves are converted into machine terms with a large labor and time and the converted informations are supplied to the input device of the computer.

A straight line or a gradually varying curve can be traced relatively simply, but where a curve to be traced contains a branch, crossing or a portion bent at an acute angle correct tracing will not be assured unless such irregular configurations are judged or processed correctly.

SUMMARY OF THE INVENTION

It is an object of this invention to provide a novel curve tracing system including means capable of discriminating portions of the curve bending at acute angles from branches and or crossings.

According to this invention a detector is provided to scan an area including a curve to determine the presence or absence thereof and to generate an electrical signal which is used to determine the direction of tracing of the detector. The detector is moved to perform a round scanning operation around the periphery of the area to produce a positional information regarding the presence or absence of the curve. As used herein the term "a round scanning" means a scan path around the periphery of a designated elemental area. In response to the information the detector is moved in a predetermined direction over a predetermined distance to trace the curve depicted on a sheet of drawing. Such an incremental tracing operation is repeated to continuously trace the curve. There are also provided means to store the previous tracing direction and means to select a particular direction having a minimum difference with respect to the previous tracing direction among directions being presently traced and containing the curve so as to provide an information regarding the presence or absence of an acute angle. With these means it is possible to trace accurately a curve even when it contains an acute angle which is often mistaken for a branch or crossing because such acute angle produces an information similar to that of the branch or crossing.

BRIEF DESCRIPTION OF THE DRAWING

The invention can be more fully understood from the following description when taken in conjunction with the accompanying drawings in which:

FIG. 7 shows a block diagram wherein various program operations of the system shown in FIG. 1 are replaced by hardware and FIGS. 8a–8d show diagrams to explain the scanning operation of a curve including a portion bent at an acute angle.

DESCRIPTION OF THE PREFERRED EMBODIMENT

Figure 1:
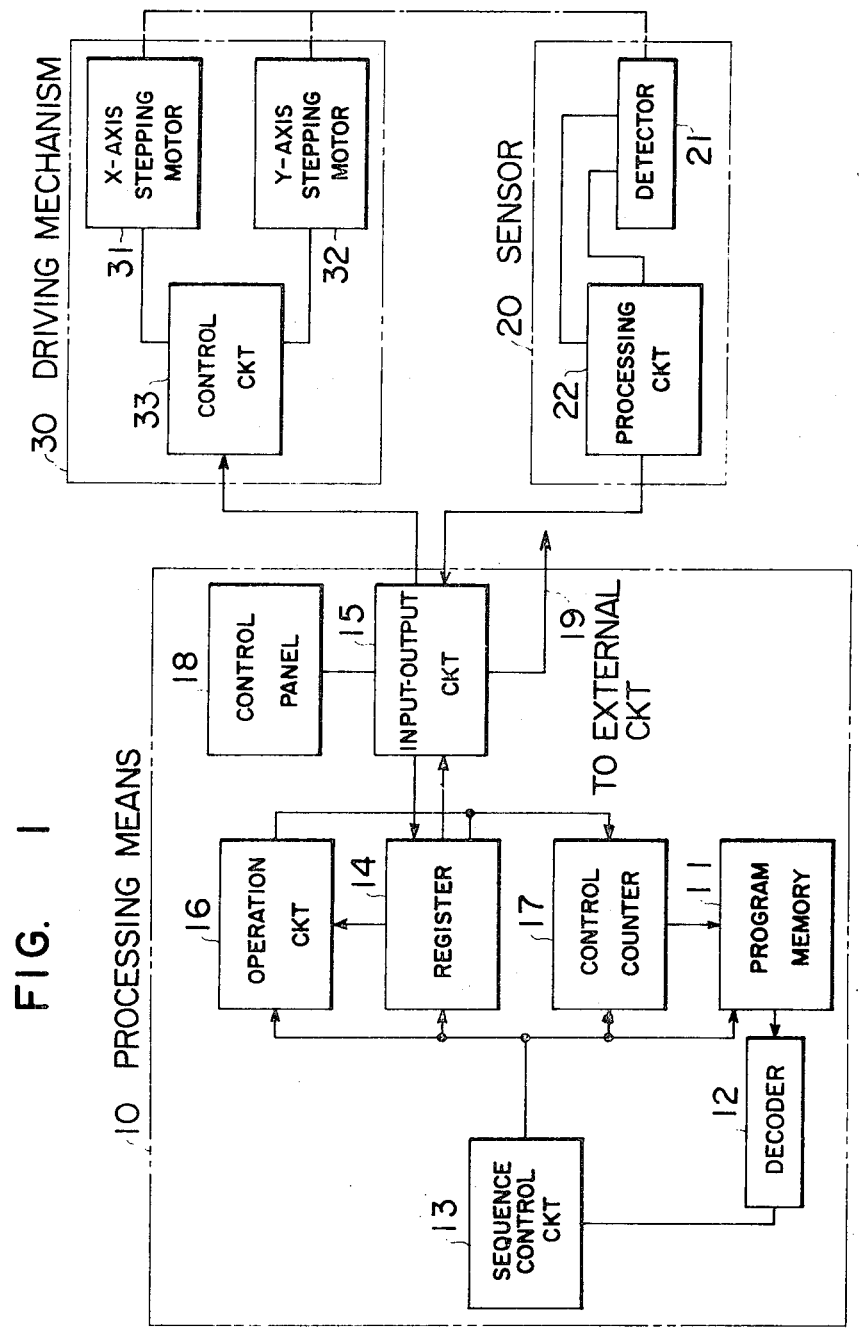
FIG. 1 is a block diagram of an automatic curve tracing system including a novel acute angle processing means.

The system in FIG. 1 comprises a processing device 10, a sensor 20 and a driving mechanism 30. Sensor 20 reads the positional information of a curve to be traced and depicted on a sheet of drawing and sends this information to the processing device 10 which suitably processes the information to provide digital signals. The driving mechanism 30 is actuated in accordance with the digital signals to move sensor 20 in a predetermined direction over a predetermined distance. The sensor 20 reads the positional information of the curve or pattern at the new position. This cycle of operation is sequentially repeated to perform automatic tracing of the curve. The digital signal produced at each scanning operation is sent to an electrical computer and the like not shown.

Figure 2:
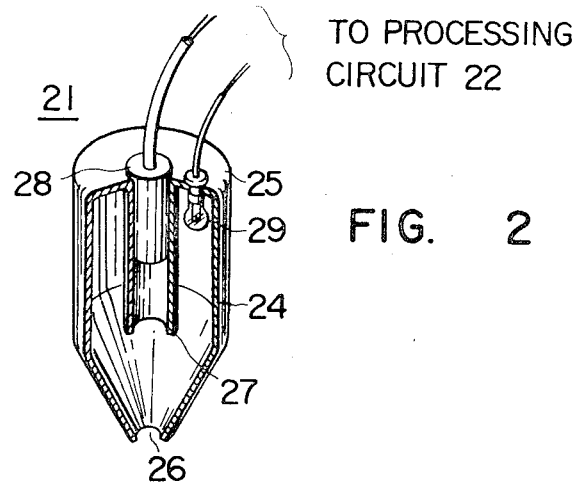
FIG. 2 is a perspective view, partly in section of a detector utilized in the system shown in FIG. 1.

The detail of each component part will now be described hereunder. Sensor 20 comprises a detector 21 which operates to convert the tone, or white and black of the pattern of the drawing into an electric signal and a processing circuit 22 to suitably process the output from detector 21. In this example detector 21 is shown as an photoelectric detector of the construction shown in FIG. 2. As shown in FIG. 2 detector 21 comprises an opaque cylindrical casing 24 having a closed upper end 25 and a frustoconical bottom with an opening 26, a cylinder 27 concentrically disposed in the casing 24 with an upper end connected to upper end 25 and a lower end terminated slightly above the opening 26, a light receiving element, i.e., a photoelectric converting element 28 contained in cylinder 27 and a source of light 29 disposed in the space defined between casing 24 and cylinder 27. Consequently, under the operating condition of the sensor 20, light is projected from source 29 to outside through opening 26 and the projected light reflected by the pattern is received by the photoelectric converting element 28 to produce an electric signal.

The processing circuit 22 operates to shape the waveform of the signal supplied from photoelectric converting element 28 to judge white and black to provide a binary output of "1" or "0," for example the former corresponding to white and the latter to black.

The driving mechanism comprises 30 two stepping motors 31 and 32 a control circuit 33 which controls these motors in response to a signal supplied from a processing device as described later in more detail.

Figure 3:
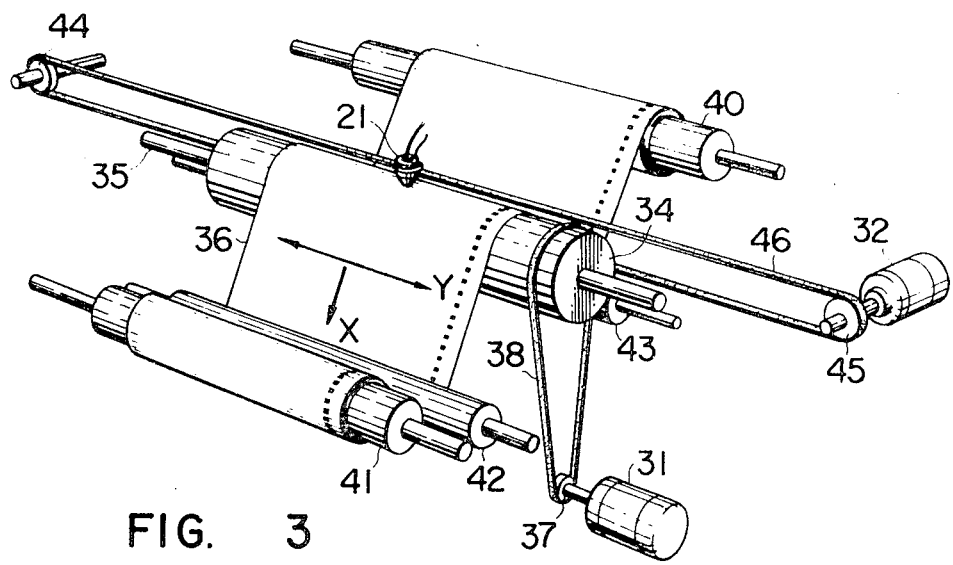
FIG. 3 is a perspective view to illustrate one example of a driving mechanism and the relationship between the detector and a sheet of drawing carrying a curve to be traced.

As shown in FIG. 3 in more detail the driving mechanism includes a rotary drum 34 having a shaft 35 and a recording paper 36 described with a pattern or curve to be traced is passed the periphery of rotary drum 34. The drum 34 is driven by the X-axis stepping motor 31 through a belt 38 to drive the recording paper in the direction X. The recording paper 36 is driven between a payout reel 40 and a takeup reel 41 and is urged against the periphery of drum 34 by a pair of guide rollers 42 and 43. Detector 21 is connected to a point of an endless belt 46 passing about pulleys 44 and 45. The detector 21 is disposed to direct its bottom opening toward the axis of drum 34 and is moved in parallel therewith or in the direction of Y. Pulley 45 is driven by the Y-axis stepping motor 32. Either of motors 31 or 32 steps a definite angle each time it receive a pulse from control circuit 33 so as to make relative movement between recording paper 36 and detector 21 over a definite distance corresponding to one step of the motor, for example 0.1 mm. In this manner, the driving mechanism 30 has similar construction and operation as a conventional incremental XY plotter.

As shown in FIG. 1, the processing device 10 comprises a program memory 11 storing a program required to scan and trace the pattern, a decoder 12 to read the program supplied by program memory 11, a sequence control circuit 13 responsive to the output of decoder 12 to control the operative sequence of various devices to be described later, and a group of registers 14 comprised by a plurality of serially connected shift registers, for example. Most of the registers function to temporally store a signal to be supplied or received from an input-output circuit 15 while remaining shift registers store constants, modes, memory addresses and return addresses. These shift registers are operated by a sequence control signal supplied from the sequence control circuit 13. An operation circuit 16 is provided to perform an addition, subtraction, logical product and logical addition operations by utilizing signals supplied from registers 14. Selection of the type of operation is performed by an operation sequence control supplied from sequence control circuit 13. The processing device 10 further comprises a control counter 17 which designates an address of the memory 11 storing the program. For example, the counter accommodates the content of the field indicating the destination of the jump when it receives a jump order, whereas it accommodates the content of the return address shift register of the group of registers when the order is returned from the subroutine. Also a control panel 18 including various switches and indicators for controlling the system is associated with the input-output circuit 15.

The system shown in FIG. 1 operates as follows: Upon depression of a start switch, not shown, on the control panel 18, various devices start to operate. Thus, detector 21 of sensor 20 begins to trace a curve or pattern in accordance with the program stored in memory 11. More particularly, detector 21 performs a round scanning operation along the periphery of a substantially square area including the curve to be traced. Such a round scanning operation can be effected by a proper control of stepping motors 31 and 32 of the driving mechanism 30 by control circuit 33. The number of spots to be plotted by one round scanning operation may be selected to any desired number according to the instruction from control panel 18. In the example shown in FIG. 4, the number of spots is 10 in the X-axis direction, and 10 in the Y-axis direction, thus there are a total of 40 spots plotted by each round scanning operation.

Figure 4:
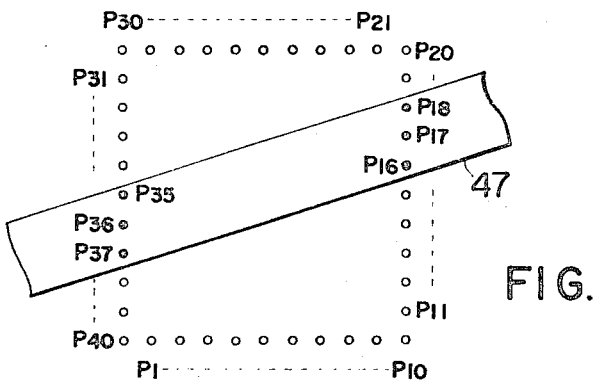
FIG. 4 is a diagram to explain a round scanning operation of detector to trace the curve and the output of the detector or a processing circuit.

The operation of various parts when tracing a typical curve on the recording paper will be described. With reference to FIG. 4 showing the operation of detector 21 when it traces a curve 47 depicted on the recording paper 36, $P_1$, $P_2$ ... $P_{40}$ show spots scanned by the detector 21 when it performs a round scanning operation relative to the recording paper 36. White and black dots shown at these scanning spots show the result of judgment of the processing circuit 22 when is processes the output from detector 21. More particularly, a white dot at spot $P_1$ shows that the result of the judgment of processing circuit 22 made on the output of detector 21 when it scans spot $P_1$ is "white" and a black dot at spot $P_{16}$ shows that the result of the judgment of processing circuit 22 made on the output of detector 21 when it scans this spot is "black." The result "black" means that there is a pattern of some configuration at that spot. Accordingly, in the example shown in FIG. 4 it is clear that there is a pattern lying on spots $P_{16}$, $P_{17}$, $P_{18}$ and spots $P_{35}$, $P_{36}$, $P_{37}$. In this manner, curve 47 is traced according to the information of these two groups of spots and information obtained at the time of previous scanning operation. These two groups of spot information are supplied to registers 14 from processing circuit 22 via input-output circuit 15 of the processing device and stored in registers 14. Information stored in these registers are operated and processed by operation circuit 16 in accordance with a prescribed program. More particularly, of said two groups of spots, spots $P_{17}$ and $P_{36}$ situated close the center of the width of curve 47 are first determined. These spots closely positioned to the center can be determined by calculating the mean value of the maximum and minimum numbers of the plots of each group. The value obtained is stored in registers. These spots $P_{17}$ and $P_{36}$ represent the direction in which curve 47 lies and either one of them indicates the direction to be traced. In order to determine which one of the information regarding the centers of respective groups dictates the direction of tracing, the direction of the previous tracing has been stored in the registers 14. Thus, the directional information most close to the previous tracing direction is judged to be the tracing direction. Thus, in the subsequent scanning operation this direction is treated as the previous tracing direction. The tracing forbidding direction is treated in the same manner. Generally, it is considered that the center of the round scanning area is situated on curve 47.

Figure 5:
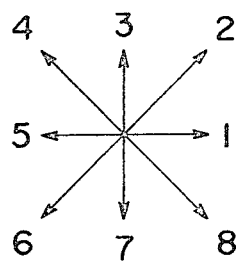
FIG. 5 shows one example of a number of predetermined reference directions utilized to determine the direction of tracing of the detector.

A method of determining the direction in which detector 21 is to be traced will now be described in detail with reference to FIG. 5. As shown in FIG. 5, eight reference directions are predetermined which are coded as "1" "2" ... "8" in the clockwise direction. Assuming now that spot $P_{17}$ represents the direction to be traced, this direction is made to correspond to reference direction "1" so as to send an output corresponding to direction "1" to control circuit 33 of the driving mechanism 30 from registers 14 over input-output circuit 15. The positional information of spot $P_{17}$ is stored in registers 14. Since there are 40 spots to be plotted and having each numbered as shown in FIG. 4, the number of spot $P_{17}$ is to be stored and this information is utilized as the previous tracing direction during a succeeding scanning operation.

Figure 6:
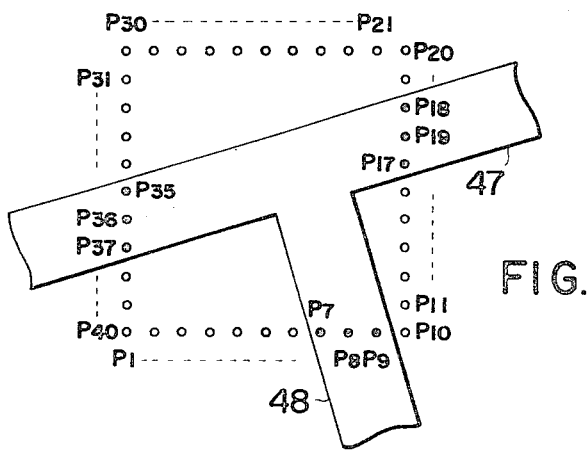
FIG. 6 is a diagram similar to FIG. 4 where the curve includes a branch.

FIG. 6 is a diagram to explain the tracing operation when curve 47 includes a branch 48. In this case information is obtained showing that the curve lies on spots $P_{35}$, $P_{36}$, $P_{37}$; $P_{16}$, $P_{17}$, $P_{18}$; and $P_7$, $P_8$, $P_9$. Similar to the case shown in FIG. 4, processing device 10 determines information regarding spots $P_{36}$, $P_{17}$ and $P_8$ near the centers of the groups from these three groups of information, and these data are compared with the information regarding the previous tracing direction to determine which direction corresponds to the tracing direction. Thus, a signal is sent to the driving mechanism 30 to perform the tracing operation in the direction thus determined. In this case, in addition to information regarding the tracing direction and the previous tracing direction information regarding to spot $P_8$ is also obtained. This information shows that there is a branched or crossing curve thus forcing processing device 10 to perform different operation. When the tracing direction at each tracing or scanning operation is denoted by a code "2, 2, 1, 3, 1 ..." this information will represent the configuration of the curve.

The above-described operation can be better understood from the following description with reference to the block diagram shown in FIG. 7 wherein various operations which are processed according to a prescribed program in FIG. 1 are replaced by hardware. FIG. 7 also shows processing device 10 and sensor 20.

In FIG. 7, source of light 27 (see FIG. 2) of detector 21 is shown as being connected to source 221 of processing circuit 22. Processing circuit 22 comprises a DC amplifier 222 and a discriminating circuit 223 responsive to the output from amplifier 222 to judge white and black. As above described, discriminating circuit 223 provides a "1" output when the spot is white whereas a "0" output in the case of the block spot. The output from discriminating circuit 223 is supplied to a previous value retainer 101 of the processing device 10. The output is also supplied to a comparator circuit 102 which compares the output from the previous value retainer 101 with he output from the discriminating circuit 223. As a result of the comparison of these two outputs when the tracing information changes from white to black a "1" output will be supplied to conductor 103 whereas when the tracing information changes from black to white a "1" output will be sent to conductor 104. The "1" output on conductor 103 is stored in a memory 105. At the same time memory 105 also stores positional information of detector 21 sent from a position counter 106.

This condition corresponds to a condition wherein the detector 21 is moved from spot $P_6$ to spot $P_7$ in FIG. 6. As the detector 21 is moved further and when comparator circuit 102 again detects the change from black to white, a "1" output is sent to a mean value determining circuit 107 over conductor 104. This condition corresponds to the movement of the detector from spot $P_9$ to spot $P_{10}$, for example, in FIG. 6. As a consequence, at this time the mean value determining circuit 107 determines the mean value of the previous positional information of detector 21 which has been stored in memory 105 and the present positional information of detector 21. In this manner, the positional information of the spot near the center is determined while detector 21 is detecting "black." This centerpoint corresponds to $P_8$, for example, in FIG. 6. This mean value is stored in either one of memories 108 through 111, for example, memory 108. When additional mean value information is sent during one round scanning operation, these information data are stored successively in other memories such as 109, 110, 111.

Figure 8:
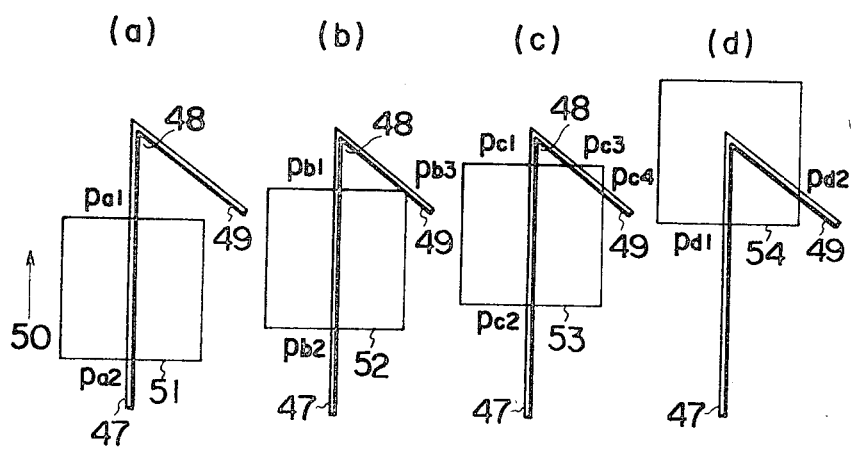

A portion of the mean value information is sent to a comparator 112 where it is compared with information from a tracing direction previous value register 113 and tracing forbidding direction previous value register 114 and the result of comparison is successively sent to a tracing direction compared value memories 115 to 118 and tracing forbidding direction compared value memories 119 to 122 and stored in these memories. Information sent to respective tracing direction compared value memories 115 to 118 are sent to a minimum value detector 123 where their minimum value is detected. Information stored in memories 108 to 111 and corresponding to this minimum, value show a value most close to the previous tracing direction. In the same manner, minimum value detector 123 detects the minimum value stored in the tracing forbidding direction compared value memories 119 to 122 so as to select information of a direction corresponding to the minimum value from memories 108 to 111. These values are sent to a tracing direction memory 124 and a tracing forbidding direction memory 125 and stored therein. Information regarding other directions are sent to other direction memories 126 and 127. The output from memory 124 is sent to input-output circuit 15 shown in FIG. 1, for example, over conductor 128. The output from input-output circuit 15 is sent to an external circuit (not shown) over conductor 19 and to the control circuit 33 of driving mechanism 30 so as to cause either one or both of stepping motors 31 and 32 to rotate one step to move one step either one or both of detector 21 and recording paper 36. At each round scanning operation, information in previous value registers 113 and 114 is changed. The above described cycle of operation is repeated to perform continuous tracing of the curve.

Where a sharp bend 49 of an acute angle 48 appears in curve 47 while it is being traced as shown in FIG. 8, such bend must be discriminated from a branch or crossing. FIGS. 8a to 8c illustrate successive scanning operations of curves 47 and 49, in which an arrow 50 indicates the direction of tracing, and 51 to 54 show successive scanning areas. FIG. 8a shows the scanning area 51 immediately before reaching curve 49. Information regarding spots $Pa_1$ and $Pa_2$ plotted at this time are treated in the same manner as above described. Thus spot $Pa_1$ is treated as that representing the tracing direction and stored in tracing direction memory 124 whereas spot $Pa_2$ is treated as that representing the tracing forbidding direction and stored in tracing forbidding direction memory 125.

As shown in FIG. 8b, during the next scanning operation 52, in addition to spots $Pb_1$ and $Pb_2$, a spot $Pb_3$ is also plotted. In other words, the number of spots is increased to three. The positional data of these spots are sequentially stored in memories 108 through 110 of the processing device shown in FIG. 1. Thus the positional information regarding spot $Pb_1$ is treated as a tracing direction information and stored in the tracing direction memory 124 and the positional information regarding spot $Pb_2$ is treated as a tracing forbidding direction information and stored in the tracing forbidding direction memory 125. The positional information regarding spot $Pb_3$ is stored temporally in memory 128 to be processed in the same manner as a branch.

As the scanning operation proceeds to an area 53 as shown in FIG. 8c, four spots $Pc_1$, $Pc_2$, $Pc_3$ and $Pc_4$ on curves 47 and 49 are plotted. Comparing this condition with that shown in FIG. 8b, it will be noted that the number of information regarding the plotted spots has increased from three to four. Under these circumstances processing to discriminate a bend from a crossing is carried out. In this case a crossing is determined by examining the phase relationship of respective spots. Again information of respective plots are temporally stored in memories, not shown, similar to spot $Pb_3$ in FIG. 8b. When the tracing operation is advanced to the scanning area 54, shown in FIG. 8d, two spots $Pd_1$ and $Pd_2$ on curve 49 will be plotted. Comparing this condition with that shown in FIG. 8c it will be noted that the number of plotted spots has decreased from four to two. Since a limiter 129 is connected to a minimum value detector 123 which supplies information to memories 124, 125 and 128 during above-described scanning operations the following operation is performed.

More particularly, limiter 129 is set to a certain value which is provided for minimum value detector 123. As a condition for the present scanning operation, minimum value detector 123 selects a value having a minimum difference with respect to the previous tracing direction and is less than the value given by limiter 129. Thus for example when an angle of $\pm 90°$ is set in the limiter 129, in the condition shown in FIG. 8d, there is no direction to be traced. During the continuous tracing operation when there is no tracing direction and when a spot $Pd_2$ is detected in addition to a spot $Pd_1$ that has been plotted previously then it is judged that the curve is bent at an acute angle. This judgment is performed by not applying information to tracing direction memory 124 but applying information to tracing forbidding direction memory 125 and memory 128.

After the acute angle has been judged as above described, tracing operation is shifted to the portion of curve 49 to the right of spot $Pd_2$.

In the state shown in FIG. 8b since a branch was judged it is necessary to erase the information of the branch at the time of judging the acute angle in order to prevent the detector from performing a branch tracing operation after it has completed a scanning operation in one direction and returned again to this state.

In some cases, after the presence of the acute angle has been judged, the portion of the curve 47 which has already been traced is again traced until the detector passes beyond the acute angle. In such cases it is also necessary to forbid to process a branch and a crossing. For this reason, after judging the acute angle, processing of the branch and crossing is forbidden over a definite distance.

While in this embodiment detector 21 is shown as being comprised by an optical detector it will be clear that any one of many other types of detectors including a well-known magnetic or electric detector may be used upon the characteristics of the pattern and ink.

Further, to simplify the construction of the driving mechanism the photoelectric converting element and the source of light may be held stationary at a point spaced apart from a readout head movable along the surface of a sheet of drawing and connected to the head through light guides comprised by optical fiber glass.

Where a single detector 21 is used as above described it is necessary to sequentially move the detector during scanning operation. Where a plurality of detectors, each disposed on one side of a square, are sequentially operated it becomes unnecessary to mechanically move a single detector to perform the round scanning operation.

Further it is not always necessary to cause a detector to perform a round scanning operation around the periphery of a square, the scanning area may take other shapes such as rectangle, hexagon, octagon or circular configuration.

What is claimed is:

1. An automatic curve tracing system comprising a detector for performing a round scanning operation along the periphery of an area containing a curve to be traced to provide information regarding the presence or absence and the position of said curve, means responsive to said information to move said detector in a predetermined direction over a predetermined distance to trace said curve, means to alternately repeat said round scanning operation and said movement of said detector to continuously scan said curve, memory means to store the direction of previous tracing during a succeeding tracing operation, and means to determine a particular direction among a number of detected directions in which said curve is present, said particular direction having a minimum difference with respect to said direction of previous tracing and said difference being within definite limits whereby to process an acute angle contained in said curve.

2. The automatic curve tracing system according to claim 1 which further comprises memory means to store a tracing direction and a tracing forbidding direction at each round tracing operation, and means responsive to the output from said detector to provide information regarding a tracing direction, a tracing forbidding direction and directions other than said tracing direction and tracing forbidding direction during a succeeding tracing operation.

3. The automatic curve tracing system according to claim 1 wherein said detector comprises a bottomed cylindrical casing, a cylinder concentrically disposed in said casing, a source of light disposed in a space defined between said casing and said cylinder and a light receiving element contained in said cylinder.

4. The automatic curve tracing system according to claim 1 wherein said means to move said detector comprises a first motor to drive said detector in one direction and a second motor to move a sheet of drawing carrying said curve to be traced in a different direction.

5. The automatic curve tracing system according to claim 1 which further comprises means to determine the center of a group of information provided by said detector during each round detecting operation thereof.

6. The automatic curve tracing system according to claim 1 which further includes memory means to store a predetermined direction, and means to store information representing a tracing direction from each group of information whereby to represent said tracing direction by said reference direction.

* * * * *

UNITED STATES PATENT OFFICE
CERTIFICATE OF CORRECTION

Patent No. 3,638,187          Dated January 25, 1972

Inventor(s) Tadashi Takahashi, Masatoshi Miyazaki, Yasuhiko Ogawa, Tadashi Sato and Kazuhiko Kakuta It is certified that error appears in the above-identified patent and that said Letters Patent are hereby corrected as shown below:

Column 2, line 14, after "system" insert -- shown --;
Column 2, line 26, change "electrical" to -- electronic --;
Column 3, line 2, "X1Y" should be -- X-Y --;
Column 3, line 19, before "supplied" insert -- signal --;
Column 3, line 48, after "will" insert -- now --;
Column 4, line 68, change "he" to -- the --;
Column 5, line 18, before "data" insert -- information --;
Column 6, line 38, after "angle" insert the numeral -- 48 --;

Signed and sealed this 8th day of August 1972.

(SEAL)
Attest:

EDWARD M. FLETCHER, JR.      ROBERT GOTTSCHALK
Attesting Officer             Commissioner of Patents